(12) United States Patent
Fujimoto et al.

(10) Patent No.: US 6,767,309 B2
(45) Date of Patent: Jul. 27, 2004

(54) AUTOMATIC TRANSMISSION CONTROL SYSTEM

(75) Inventors: Shuichi Fujimoto, Wako (JP); Akihira Aoki, Wako (JP); Hiroshi Saotome, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/171,151

(22) Filed: Jun. 12, 2002

(65) Prior Publication Data

US 2003/0022742 A1 Jan. 30, 2003

(30) Foreign Application Priority Data

Jun. 12, 2001 (JP) ..................................... 2001-176966

(51) Int. Cl.[7] .............................................. B60K 41/12
(52) U.S. Cl. ............................ 477/44; 477/45; 477/50
(58) Field of Search ............................ 477/44, 38, 39, 477/40, 45, 46, 50, 158

(56) References Cited

U.S. PATENT DOCUMENTS

| | | | | |
|---|---|---|---|---|
| 5,086,669 A | * | 2/1992 | Fujiwara et al. | 477/159 |
| 5,203,233 A | * | 4/1993 | Hattori et al. | 477/45 |
| 5,679,095 A | * | 10/1997 | Sekine et al. | 477/116 |
| 6,336,888 B1 | * | 1/2002 | Eguchi | 477/3 |
| 6,383,115 B1 | * | 5/2002 | Kawamura | 477/50 |

FOREIGN PATENT DOCUMENTS

| | | | | |
|---|---|---|---|---|
| JP | 05332430 A | * | 12/1993 | ........... F16H/61/00 |
| JP | 08178059 A | | 7/1996 | |

* cited by examiner

Primary Examiner—Tisha D Lewis
Assistant Examiner—Deborah Nash
(74) Attorney, Agent, or Firm—Lahive & Cockfield, LLP; Anthony A. Laurentano

(57) ABSTRACT

An automatic transmission comprises a metal V-belt mechanism 10, which changes the speed ratio of the rotational output from an engine ENG, a forward/reverse direction change mechanism 20, which switches the rotational direction of the ratio-change mechanism, and a forward clutch 30, which actuates the switching operation of the rotational direction performed by the forward/reverse direction-change mechanism. A control system for this transmission comprises a regulator valve 50, which generates a line pressure, a manual valve 80, which is operated in correspondence to the shift lever and switches the supply of the line pressure to the forward clutch, and a drive-range sensor 105, which detects the operation of the manual valve. When the movement of the manual valve to a position where the line pressure is to be supplied to the forward clutch is detected by the drive-range sensor 105, the line pressure, which is adjusted by the regulator valve, is lowered for a predetermined time period.

6 Claims, 7 Drawing Sheets

AUTOMATIC TRANSMISSION CONTROL SYSTEM

FIELD OF THE INVENTION

The present invention relates generally to an automatic transmission comprising a ratio-change mechanism, which transmits the rotational driving force of a drive power source varying a speed ratio, and a forward/reverse direction-change mechanism, which changes the direction of the rotation of the driving force. Furthermore, the present invention relates to an automatic transmission that comprises a belt-type continuously variable speed control mechanism as ratio-change mechanism.

BACKGROUND OF THE INVENTION

Such an automatic transmission is designed for use in a vehicle to transmit the rotational driving force of an engine (drive power source) varying a speed ratio, in which the rotational speed being transmitted is controlled in correspondence to the throttle opening of the engine, the speed of the vehicle, etc. Such an automatic transmission generally comprises hydraulic actuators such as hydraulic clutches and brakes to achieve this speed ratio control. For example, an automatic transmission may comprise a belt-type continuously variable speed control mechanism disclosed in Japanese Laid-Open Patent Publication No. H08(1996)-178059. In this case, the automatic transmission comprises a clutch mechanism that transmits the driving force of the engine to the transmission, in addition to the belt-type continuously variable speed control mechanism, and these mechanisms are controlled by supplies of hydraulic pressure. While the shift lever is at "N" position, the clutch mechanism is released to set the transmission in neutral condition. When the shift lever is shifted from "N" position to "D" position, the clutch mechanism is engaged, and the continuously variable speed control mechanism is set in speed ratio control. In this instance, if the clutch mechanism is brought into engagement abruptly, then a shock may happen. To avoid such a shock, the hydraulic pressure supplied to the clutch mechanism is gradually increased by means of a solenoid valve.

By the way, another construction of automatic transmission is known, which transmission comprises a forward/reverse direction-change mechanism provided on the output side of the engine, a belt-type continuously variable speed control mechanism provided in connection to the forward/reverse direction-change mechanism, and a starting clutch mechanism connected to the output shaft of this continuously variable speed control mechanism. In this case, the starting clutch mechanism is used for controlling the power transmission to the drive wheels. When the shift lever is at "N" position (neutral range), the transmission is set in neutral condition. In this condition, the starting clutch mechanism is in disengagement, so the power transmission through the starting clutch mechanism is cut off. In addition, the forward/reverse direction-change mechanism is also disengaged in this condition.

In this automatic transmission, when the shift lever is shifted from "N" position to "D" position (for the forward drive range), the line pressure is led to the forward drive clutch that actuates the forward/reverse direction-change mechanism into engagement. At the same time, a pressure for starting control is supplied to the starting clutch to actuate it into engagement. In this way, the rotational direction of the driving force of the engine is set by the forward/reverse direction-change mechanism, the rotational speed to be transmitted is determined by the continuously variable speed control mechanism in speed ratio control, and the transmission of this rotation to the drive wheels is controlled by the starting clutch. Especially, the starting clutch is controlled appropriately to start the vehicle smoothly.

In this automatic transmission, however, as the pulleys comprising the continuously variable speed control mechanism have a relatively large inertia, when the forward/reverse direction-change mechanism is brought into engagement by the supply of the line pressure, the continuously variable transmission having a large inertia is connected to the output shaft of the engine. As a result, even though the starting clutch is disengaged, the whole of the power plant including the engine experiences a vibration as the engine tries to rotate the transmission against the large rotational inertia. This vibration is transmitted to the body of the vehicle, which supports the power plant, and induces a shaking of the vehicle body. As the rotational speed of the engine is reduced temporarily, a rotational vibration or a noise may also occur. These same problems may be also experienced when the shift lever is shifted from "N" position to "R" position (for the rearward drive range) or when the shift lever is shifted directly from "D" position to "R" position or from "R" position to "D" position.

SUMMARY OF THE INVENTION

It is an object of the present invention to provide a control system for an automatic transmission, which system can bring the forward/reverse direction-change mechanism into engagement smoothly, preventing any vibration or noise that may otherwise occur when the shift lever is operated in the above described ways.

According to the present invention, an automatic transmission comprises a ratio-change mechanism (for example, the metal V-belt mechanism 10 described in the following embodiment, another type of continuously variable transmission, a normal transmission, etc.), a forward/reverse direction-change mechanism (for example, the forward/reverse direction-change mechanism 20 described in the following embodiment, another type of forward/reverse direction-change mechanism, etc.) and a forward/reverse direction-change actuator (for example, the forward clutch 30 and the reverse brake 25 described in the following embodiment). The ratio-change mechanism transmits rotational driving force from a drive power source (for example, the engine ENG in the following embodiment) changing a speed ratio, and the forward/reverse direction-change mechanism switches the rotational direction of the rotational driving force transmitted from the drive power source through the ratio-change mechanism. The forward/reverse direction-change actuator, by receiving a hydraulic pressure, actuates the rotational direction switching operation of the forward/reverse direction-change mechanism. A control system for this automatic transmission comprises a regulator valve (for example, the regulator valve 50 described in the following embodiment), a manual switching valve (for example, the manual valve 80 described in the following embodiment) and a switching operation detector (for example, the drive-range sensor 105 described in the following embodiment). The regulator valve generates a line pressure by adjusting the pressure of a hydraulic pressure source, the manual switching valve is operated by an external factor, to switch the supply of oil at the line pressure to the forward/reverse direction-change actuator, and the switching operation detector detects the movement of the manual switching valve. When the movement of the manual switching valve to a position where the line pressure is to be supplied to the forward/reverse direction-change actuator is detected by the switching operation detector, the line pressure, which is adjusted by the regulator valve, is lowered for a predetermined time period immediately after this detection.

With this control system, for example, when the shift lever is manipulated from "N" position to "D" position to shift the manual switching valve from its N position to its D position, the line pressure adjusted by the regulator valve is supplied to the forward clutch (or to the reverse brake), which constitutes the forward/reverse direction-change mechanism, for the engagement of the forward clutch. In this instance, during the predetermined time period after the manual switching valve has set at the D position, the line pressure, which is adjusted by the regulator valve, is lowered to gradually engage the forward clutch. In this way, the ratio-change mechanism, which has a relatively large rotational inertia, is brought gradually into engagement with the output shaft of the engine. As the rotational inertia of the ratio-change mechanism is gradually received by the output shaft of the engine, the forward clutch is smoothly brought into engagement without any shock or noise.

This automatic transmission may comprise a ratio-controlling actuator (for example, the drive cylinder chamber 14 and the driven cylinder chamber 19 described in the following embodiment), which receives a hydraulic pressure to actuate the speed ratio control of the ratio-change mechanism. In this case, the ratio-controlling actuator receives the line pressure to actuate the speed ratio control. The hydraulic pressure supplied to this ratio-controlling actuator is to control the torque transmission of the ratio-change mechanism. When the line pressure supplied to the forward clutch is low, the torque transmission through the forward clutch is small. Therefore, there is no problem to supply this low line pressure also to the ratio-controlling actuator. By lowering the line pressure in this way, the power requirement for running the pump to generate the line pressure is reduced to improve fuel efficiency.

According to another feature of the present invention, an automatic transmission comprises a continuously variable speed control mechanism (for example, the metal V-belt mechanism 10 described in the following embodiment), a forward/reverse direction-change mechanism (for example, the forward/reverse direction change mechanism 20 described in the following embodiment) and a forward/reverse direction-change actuator (for example, the forward clutch 30 and the reverse brake 25 described in the following embodiment). In this case, the continuously variable speed control mechanism comprises a variable width drive pulley, a variable width driven pulley and belt means, which is disposed around these pulleys, for transmitting the rotational driving force of a drive power source (for example, the engine ENG in the following embodiment) at a continuously variable speed change ratio. The forward/reverse direction-change mechanism switches the rotational direction of the rotational driving force transmitted from the drive power source through the speed control mechanism, and the forward/reverse direction-change actuator, by receiving a hydraulic pressure, actuates the rotational direction switching operation of the forward/reverse direction-change mechanism. A control system for this automatic transmission comprises a regulator valve (for example, the regulator valve 50 described in the following embodiment), a manual switching valve (for example, the manual valve 80 described in the following embodiment) and a switching operation detector (for example, the drive-range sensor 105 described in the following embodiment). The regulator valve generates a line pressure by adjusting the pressure of a hydraulic pressure source, the manual switching valve is operated by an external factor, to switch the supply of oil at the line pressure to the forward/reverse direction-change actuator, and the switching operation detector detects the movement of the manual switching valve. When the movement of the manual switching valve to a position where the line pressure is to be supplied to the forward/reverse direction-change actuator is detected by the switching operation detector, the line pressure, which is adjusted by the regulator valve, is lowered for a predetermined time period immediately after this detection.

In this arrangement, also, when the shift lever is manipulated from "N" position to "D" position to engage the forward clutch, during the predetermined time period after the manual switching valve has set at the D position, the line pressure, which is adjusted by the regulator valve, is lowered to gradually engage the forward clutch. In this way, the continuously variable speed control mechanism, which has a relatively large rotational inertia, is brought gradually into engagement with the output shaft of the engine. As the rotational inertia of the continuously variable speed control mechanism is gradually received by the output shaft of the engine, the forward clutch is smoothly brought into engagement without any shock or noise.

Furthermore, the control system may comprise a drive cylinder chamber provided in the drive pulley, a driven cylinder chamber provided in the driven pulley and a shift control valve (for example, the drive and driven shift control valves 60 and 65 described in the following embodiment), which controls a supply of hydraulic pressure to the drive cylinder chamber and the driven cylinder chamber. In this case, the shift control valve controls the supply of oil at the line pressure to the drive cylinder chamber and the driven cylinder chamber. With this arrangement, when the line pressure is lowered during the predetermined time period after the manual switching valve has shifted to the position where the line pressure is to be supplied to the forward/reverse direction-change actuator, the drive and driven cylinder chambers also receive this lowered line pressure. Because of the line pressure being lowered in this way, the power requirement for running the pump to generate the line pressure is reduced to improve fuel efficiency.

The forward/reverse direction-change mechanism may be disposed between the drive power source and the continuously variable speed control mechanism, and clutching means (for example, the starting clutch 40 described in the following embodiment) for controlling the transmission of the drive power may be provided on the output side of the continuously variable speed control mechanism. In this case, the lowered line pressure is used for engaging the forward/reverse direction-change mechanism smoothly and then for engaging the clutching means smoothly, thus achieving a smooth starting operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
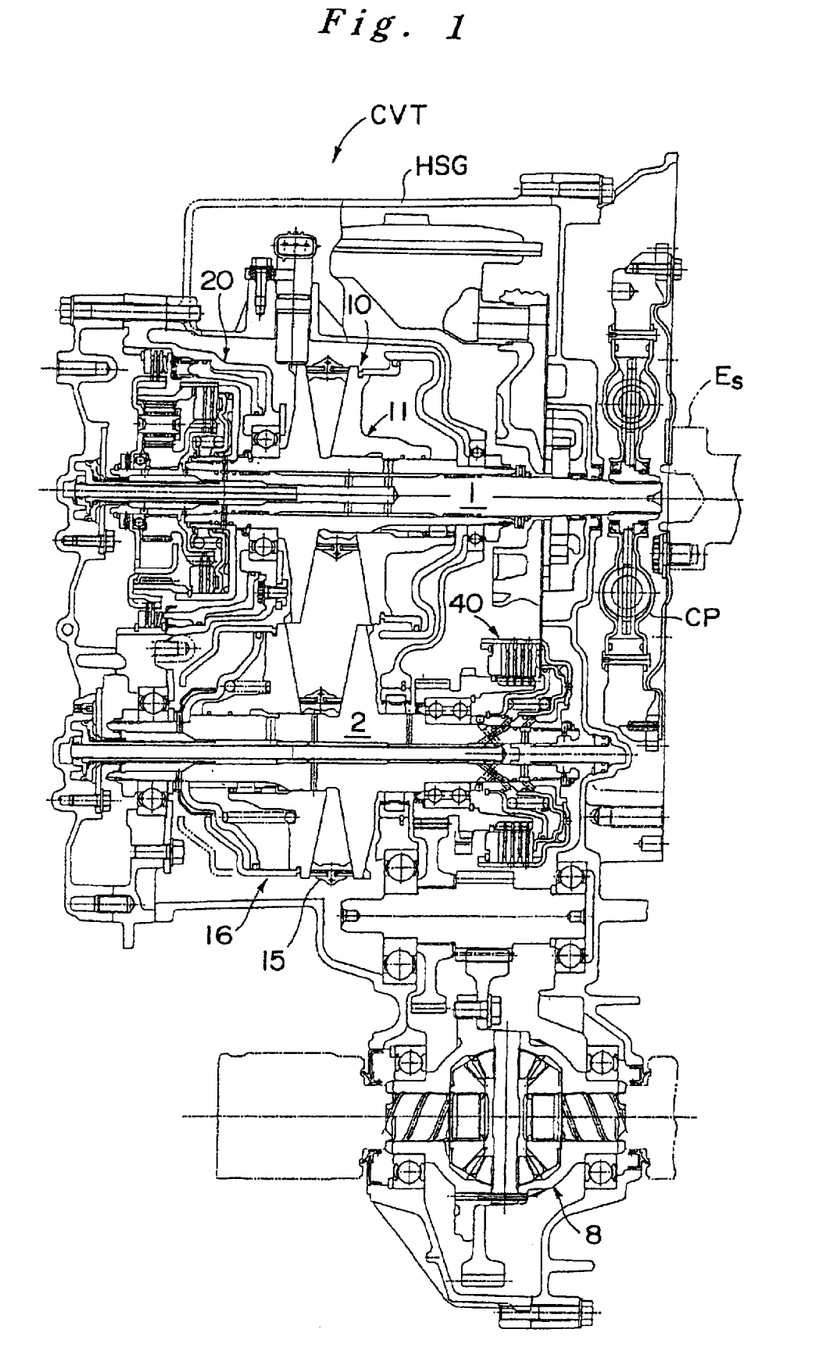
FIG. 1 is a cross-sectional view of a belt-type continuously variable transmission, whose speed ratio is controlled by a control system according to the present invention.
Figure 2:
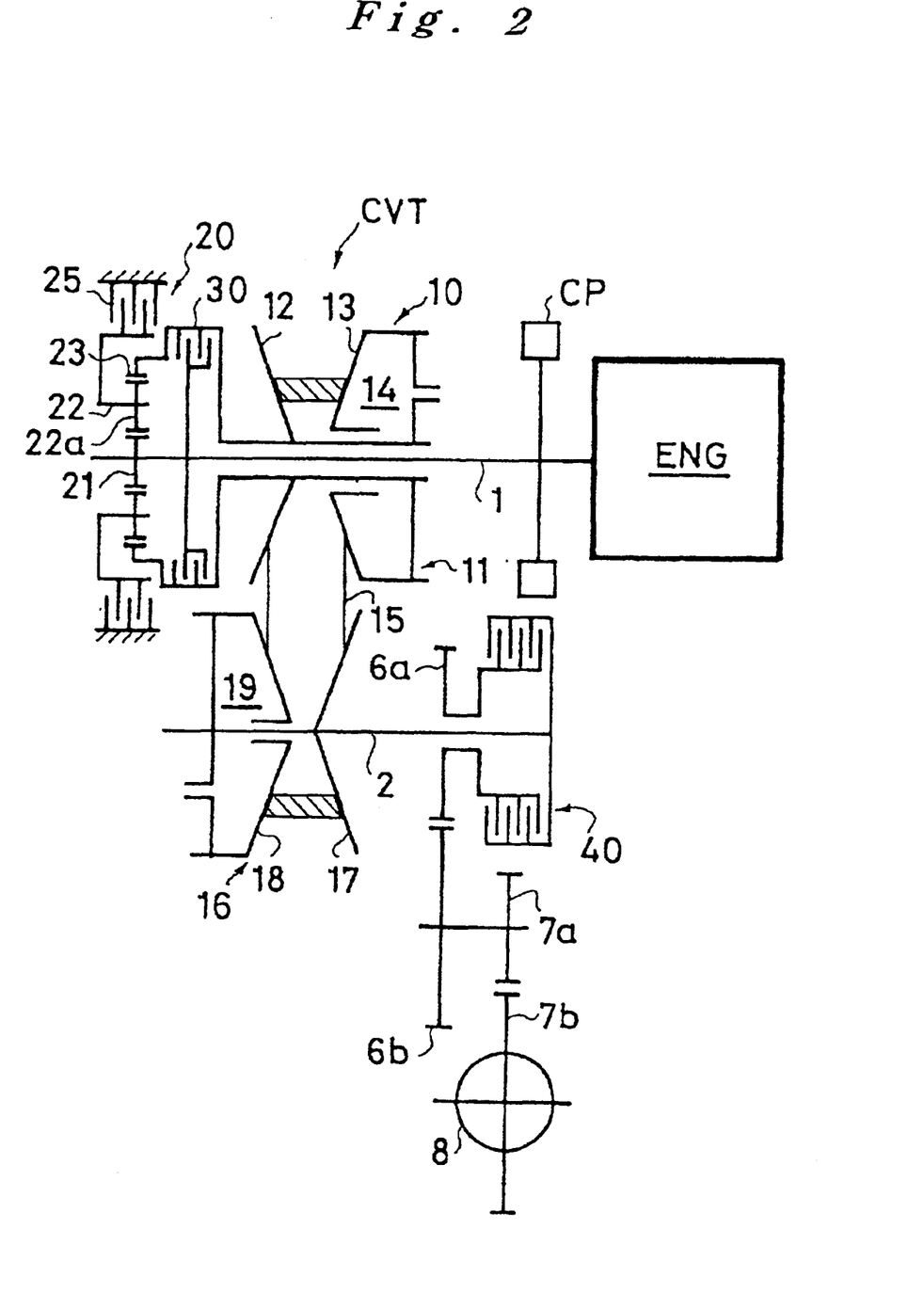
FIG. 2 is a schematic diagram showing the power transmission paths of this belt-type continuously variable transmission.

Now, a preferred embodiment of the present invention is described in reference to the drawings. FIGS. 1 and 2 show a belt-type continuously variable transmission CVT, whose ratio control is performed by a control system according to the present invention. This belt-type continuously variable transmission CVT comprises an input shaft 1, a countershaft 2, a metal V-belt mechanism 10, a planetary gear type forward/reverse direction change mechanism 20, a starting clutch mechanism 40, power transmission gear trains 6a, 6b, 7a and 7b, and a differential mechanism 8 in a transmission housing HSG. The input shaft 1 of the transmission is connected through a coupling mechanism CP to the output shaft Es of the engine ENG. The metal V-belt mechanism 10 connects rotationally the input shaft 1 and the countershaft 2, which is provided parallel with the input shaft 1. The forward/reverse direction change mechanism 20 is disposed over the input shaft 1, and the starting clutch mechanism 40 is disposed on the countershaft 2.

The metal V-belt mechanism 10 comprises a drive pulley 11, which is disposed over the input shaft 1, a driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which rotates with stationary pulley half 12 and, at the same time, movable with respect to the stationary pulley half 12 in the axial direction of the pulley 11. The axial shift of the movable pulley half 13 is executed by the pressure supplied into a drive-pulley cylinder chamber 14 provided to the drive pulley 11. On the other hand, the driven pulley 16 comprises a stationary pulley half 17, which is fixed on the countershaft 2, and a movable pulley half 18, which rotates with the stationary pulley half 17 and movable with respect to the stationary pulley half 17 in the axial direction of the pulley. The axial shift of the movable pulley half 18 is executed by the pressure supplied into a driven-pulley cylinder chamber 19 provided to the driven pulley 16.

In this construction, the hydraulic pressure supplied to each of these cylinder chambers 14 and 19 is controlled to generate an appropriate thrust that acts on the respective movable pulley half 13 or 18 so as to vary appropriately the width of the drive or driven pulley 11 or 16. This pressure control enables the pitch radii of the respective pulleys 11 and 16 for the V belt 15 to change continuously, and thus the speed change ratio of the transmission is variable continuously.

The forward/reverse direction change mechanism 20 comprises a planetary gear train, which includes a sun gear 21, a carrier 22 and a ring gear 23. The sun gear 21 is connected to the input shaft 1, and the carrier 22 is rotatable coaxially with the sun gear 21 and retains rotatably a plurality of pinions 22a, which mesh with the sun gear 21. The ring gear 23 is also rotatable coaxially with the sun gear 21 and meshes with the pinions 22a. In addition, the forward/reverse direction change mechanism 20 includes a reverse brake 25, which can hold the carrier 22 stationary, and a forward clutch 30, which engages and disengages the sun gear 21 to and from the ring gear 23.

In this arrangement, when the forward clutch 30 is actuated for engagement while the reverse brake 25 is not engaged, the sun gear 21 and the ring gear 23 are connected with each other. In this condition, the sun gear 21, the carrier 22 and the ring gear 23 are all rotatable in unison with the input shaft 1, and the drive pulley 11 is rotatable in the same direction as the input shaft 1 (forward drive direction). On the other hand, when the forward clutch 30 is released and the reverse brake 25 is engaged, the carrier 22 is held stationary. In this condition, the ring gear 23 is rotatable in the direction opposite to that of the sun gear 21, so the drive pulley 11 is now rotatable in the direction opposite to that of the input shaft 1 (rearward drive direction).

The forward clutch 30 comprises a hydraulically actuated wet type multiple disc clutch, whose actuation for engagement and disengagement is controlled by means of the hydraulic pressure being applied thereto. In the same way, the reverse brake 25 comprises a hydraulically actuated wet type multiple disc brake, whose actuation for engagement and disengagement is controlled by means of the hydraulic pressure being applied thereto.

In this transmission, the rotation of the input shaft 1 is switched by the forward/reverse direction change mechanism 20 and transmitted to the drive pulley 11 either in the forward drive or rearward drive direction. The speed of this rotation is varied continuously by the metal V-belt mechanism 10 and is transmitted to the countershaft 2. Then, the starting clutch 40, which is mounted on the countershaft 2, controls the transmission of the drive power to a power transmission gear 6a. The starting clutch 40 also comprises a hydraulically actuated wet type multiple disc clutch, whose actuation for engagement and disengagement is controlled by means of the hydraulic pressure being applied thereto.

The rotational driving force being controlled by the starting clutch 40 and transmitted to the power transmission gear 6a is then transmitted through the power transmission gear trains 6a, 6b, 7a and 7b, which includes the power transmission gear 6a, and through the differential mechanism 8 to the right and left drive wheels (not shown). In this arrangement, by controlling the engagement of the starting clutch 40, the rotational driving force transmitted to the drive wheels is controllable. For example, the starting of the vehicle is controlled by the engagement control of the starting clutch 40.

In this continuously variable transmission, the drive and driven cylinder chambers 14 and 19, which constitute the metal V-belt mechanism 10, are charged and discharged with oil to achieve a continuous or step-less speed ratio control of the transmission. Along with this continuous speed ratio control, the supply of the hydraulic pressure to the forward clutch 30 and the reverse brake 25 is controlled to achieve a forward/reverse direction-change while the hydraulic pressure for the engagement of the starting clutch 40 is also controlled to appropriately transmit the driving force to the drive wheels. The control system according to the present invention functions to manage these control operations. This control system is now described in reference to FIGS. 3 and 4. In these drawings, the ports marked with "x" are led to the drain of the hydraulic circuit, i.e., to the oil tank.

Figure 3:
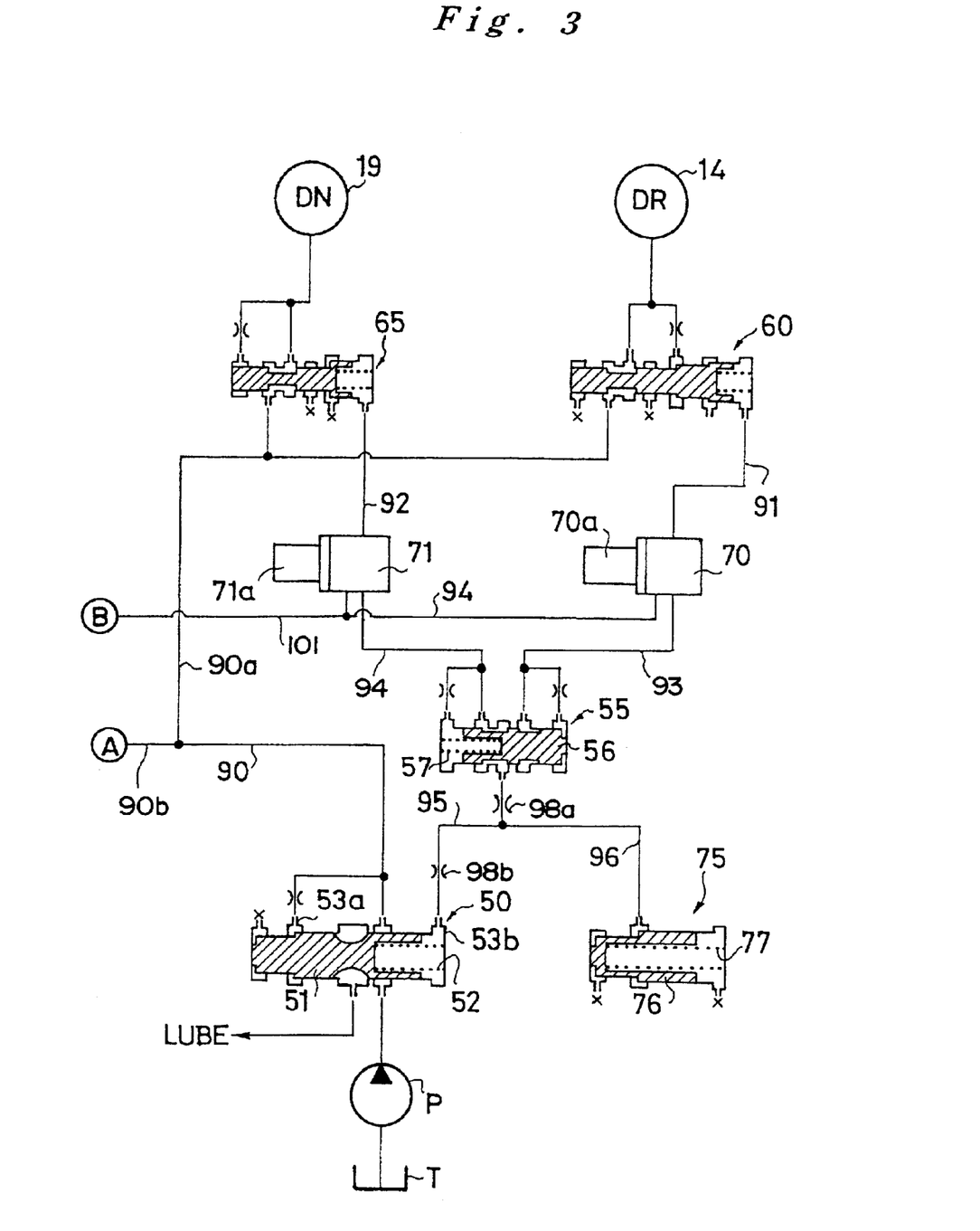
FIG. 3 is a hydraulic circuit diagram showing a section of the hydraulic controller of the control system.

In this hydraulic controller, oil in the oil tank T (for example, the bottom space of the transmission housing HSG) is supplied by an oil pump P to a regulator valve 50, which adjusts the pressure of the oil and generates a line pressure PL. The oil at the line pressure PL is then supplied through lines 90 and 90a to a drive shift control valve 60, which controls the charge and discharge of the oil to and from the drive cylinder chamber 14, and to a driven shift control valve 65, which controls the charge and discharge of the oil to and from the driven cylinder chamber 19.

The drive shift control valve 60 is connected through line 91 to a drive control valve 70, which comprises a solenoid valve with a solenoid 70a. In correspondence to the control current being supplied to the solenoid 70a, the drive control valve 70 produces a drive signal pressure Pdr from the modulator pressure PM supplied through line 101 from a modulator valve 85 described in detail later in this section, and the drive signal pressure Pdr being so produced is led through line 91 to the drive shift control valve 60. In this arrangement, the drive shift control valve 60 in response to the drive signal pressure Pdr, charges or discharges the drive cylinder chamber 14 with the oil at the line pressure PL being supplied through lines 90 and 90a.

On the other hand, the driven shift control valve 65 is connected through line 92 to a driven control valve 71, which comprises a solenoid valve with a solenoid 71a. In correspondence to the control current being supplied to the solenoid 71a, the driven control valve 71 produces a driven signal pressure Pdn from the modulator pressure PM supplied through line 101, and the driven signal pressure Pdn being so produced is led through line 92 to the driven shift control valve 65. In this arrangement, the driven shift control valve 65 in response to the driven signal pressure Pdn, charges or discharges the driven cylinder chamber 19 with the oil at the line pressure PL being supplied through line 90 and 90a.

The drive signal pressure Pdr being produced by the drive control valve 70 and the driven signal pressure Pdn being produced by the driven control valve 71 are also supplied to a switching valve 55, respectively through line 93 and through line 94. The switching valve 55, which comprises a spool 56 and a spring 57, receives the drive signal pressure Pdr and the driven signal pressure Pdn with the right and left ends of the spool 56 as shown in the drawing. In this arrangement, the spool 56 is shifted rightward or leftward in correspondence to the balance of the forces exerted by the drive and driven signal pressures Pdr and Pdn and the spring 57, so the switching valve 55 functions to select the pressure higher of the two, through a passage created in this balance, i.e., the combined force exerted by the drive signal pressure Pdr and the spring being against the force exerted by the driven signal pressure Pdn. As a result, either the drive signal pressure Pdr or the driven signal pressure Pdn that is the higher of the two is led through a signal pressure supply line 95 to port 53b of the regulator valve 50.

In the regulator valve 50, which comprises a spool 51 and a spring 52, the line pressure PL being supplied through line 90 is adjusted against the signal pressure being supplied through the signal pressure supply line 95 in the balance of the forces exerted by the line pressure PL on one side of the spool 51 and by the signal pressure and the spring 52 on the other side. In other words, the line pressure PL is set in correspondence with the signal pressure being supplied through the signal pressure supply line 95 (as mentioned above, the signal pressure being supplied here is selected by the switching valve 55 as the higher of the two pressures, i.e., the drive signal pressure Pdr and the driven signal pressure Pdn). Therefore, as the line pressure PL changes in correspondence with the signal pressure supplied through the signal pressure supply line 95, it is possible to adjust the line pressure PL to a desired pressure by adjusting the signal pressure with the drive control valve 70 and the driven control valve 71.

The signal pressure supply line 95 is connected through line 96 to an accumulator 75, which comprises a spool 76 and a spring 77. The accumulator 75 functions to restrain the fluctuation of the pressure of the signal pressure supply line 95 by receiving the pressure with the spool 76, which slides against the biasing force of the spring 77. Additionally, the signal pressure supply line 95 is provided with a first orifice 98a and a second orifice 98b at positions before and after the accumulator 75 in the flow of oil as shown in the drawing.

As described above, the operation of the switching valve 55 to select either the drive signal pressure Pdr or the driven signal pressure Pdn is executed with the spool 56, which is shifted rightward or leftward. During the shift of the spool, there is a moment when the fluid communication between line 93 or 94 and the signal pressure supply line 95 is cut out. In this instance, the signal pressure supply line 95 is blocked off, so if this condition is left as it is, i.e., without the accumulator 75, a little movement of the spool 51 of the regulator valve 50 would cause an abrupt increase or a surge in the internal pressure. However, as the signal pressure supply line 95 is provided with the accumulator 75 through line 96, such a surge in the internal pressure cannot happen. In addition, the presence of the second orifice 98b between the regulator valve 50 and the accumulator 75 enhances the effect of reducing the occurrence of pressure surge.

In the condition where the signal pressure supply line 95 is in fluid communication with either line 93 or line 94, and either the drive signal pressure Pdr or the driven signal pressure Pdn is applied to port 53b of the regulator valve 50, the accumulator 75 restrains the fluctuation of the signal pressure (the drive signal pressure Pdr or the driven signal pressure Pdn) being supplied to the port. As a result, the fluctuation of the line pressure PL being adjusted by the regulator valve 50 is also minimized to stabilize the speed ratio control, which is executed with the line pressure PL. In addition, the presence of the first orifice 98a at the position shown in the drawing enhances the effect of reducing the fluctuation of the signal pressure.

Figure 4:
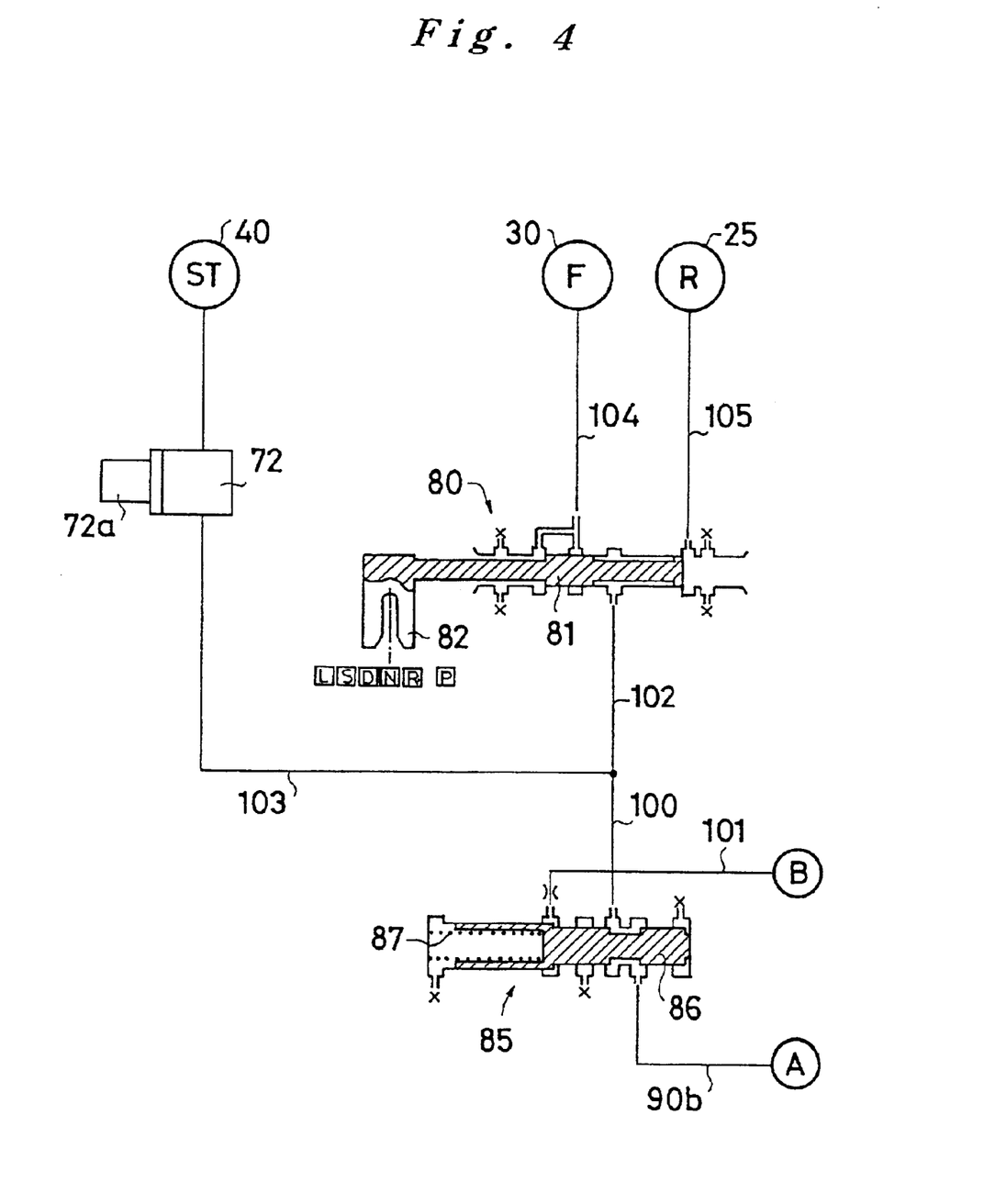
FIG. 4 is a hydraulic circuit diagram showing another section of the hydraulic controller of the control system.

On the other hand, the oil at the line pressure PL, which is adjusted by the regulator valve 50, is supplied also to the modulator valve 85 through line 90b, which is branched from line 90 (refer to FIG. 4). The modulator valve 85, which comprises a spool 86 and a spring 87, adjusts the pressure of line 100 to the modulator pressure PM that is a pressure equal to or lower than a predetermined pressure in the balance of the forces exerted on the spool 86 by the spring 87 and by the pressure of the line 100 downstream. As a result, line 100 is supplied with the oil whose pressure is adjusted to the modulator pressure PM, which is lower than the line pressure PL. If the line pressure PL is equal to or lower than the predetermined pressure, then the line pressure PL as is is supplied as the modulator pressure PM to line 100. The oil at the modulator pressure PM is also supplied through line 101 to the drive shift control valve 60 and the driven shift control valve 65.

Furthermore, the oil at the modulator pressure PM is supplied through line 102 to a manual valve 80. The manual valve comprises a spool 81, which is connected through a connector 82 to the shift lever at the driver's seat (not shown) and is axially movable in correspondence to the manipulation of the shift lever. In response to the shift of the spool 81 in the manual valve 80, the supply of the modulator pressure PM is directed either through line 104 to the forward clutch 30 or through line 105 to the reverse brake 25.

The modulator pressure PM is also supplied through line 103 branching from line 100 to a starting clutch control valve 72, which comprises a linear solenoid valve with a solenoid 72a for controlling the pressure of the oil supplied to the starting clutch 40. In correspondence to the control current being applied to the solenoid 72a, the starting clutch control valve 72 produces a starting clutch control pressure Pst from the modulator pressure PM, and the starting clutch control pressure Pst is supplied to the starting clutch 40 for the engagement control thereof.

In this hydraulic controller, the shift of the manual valve 80 leads correspondingly to the current control of the solenoid 70a of the drive control valve 70, the current control of the solenoid 71a of the driven control valve 71, and the current control of the solenoid 72a of the starting clutch control valve 72, which result in the above mentioned forward/reverse direction change, continuous speed ratio change and transmission of the driving force to the drive wheels. Now, the construction of the control system and the control steps executed by the control system are described in the following.

Figure 5:
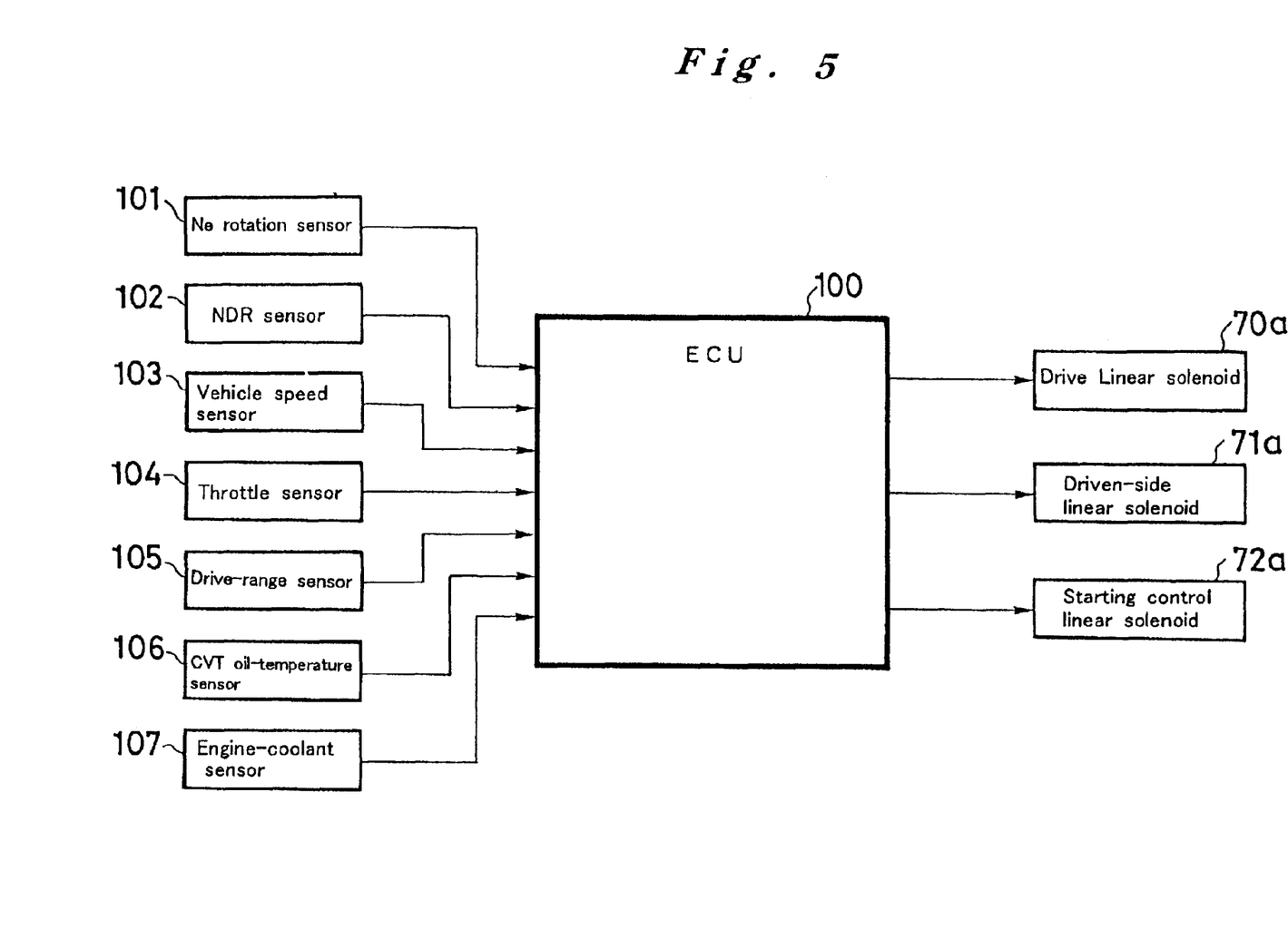
FIG. 5 is a block diagram showing the construction of the control system.

FIG. 5 shows schematically the construction of the control system. The above mentioned control is executed by control signals that are output from a control unit 100 to these solenoids 70a, 71a and 72a. For the determination of the control signals, the control unit 100 receives, as inputs, a signal NE from an engine rotation sensor 101, which detects the rotation of the engine, a signal NDR from a drive pulley rotation sensor 102, which detects the rotation of the drive pulley 11, a signal V from a vehicle speed sensor 103, which detects the speed of the vehicle, a signal θ TH from a throttle sensor 104, which detects the throttle opening of the engine ENG, a signal RS from a drive-range sensor 105, which detects the current drive range, a signal TCVT from a CVT oil-temperature sensor 106, which detects the oil temperature of the transmission, and a signal TENG from an engine-coolant temperature sensor 107, which detects the temperature of the engine coolant.

Figure 6:
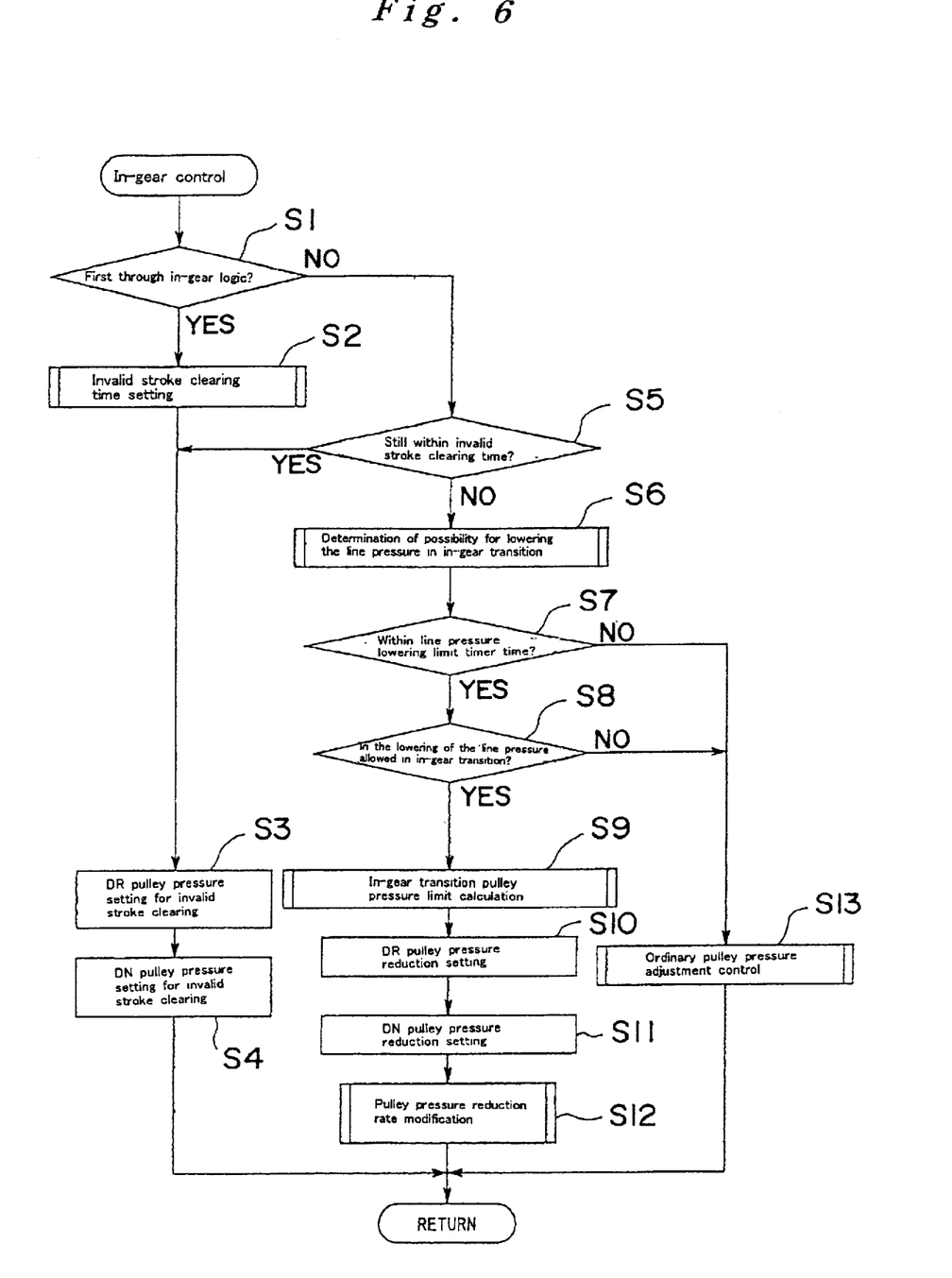
FIG. 6 is a flowchart showing control steps executed by the control system.
Figure 7:
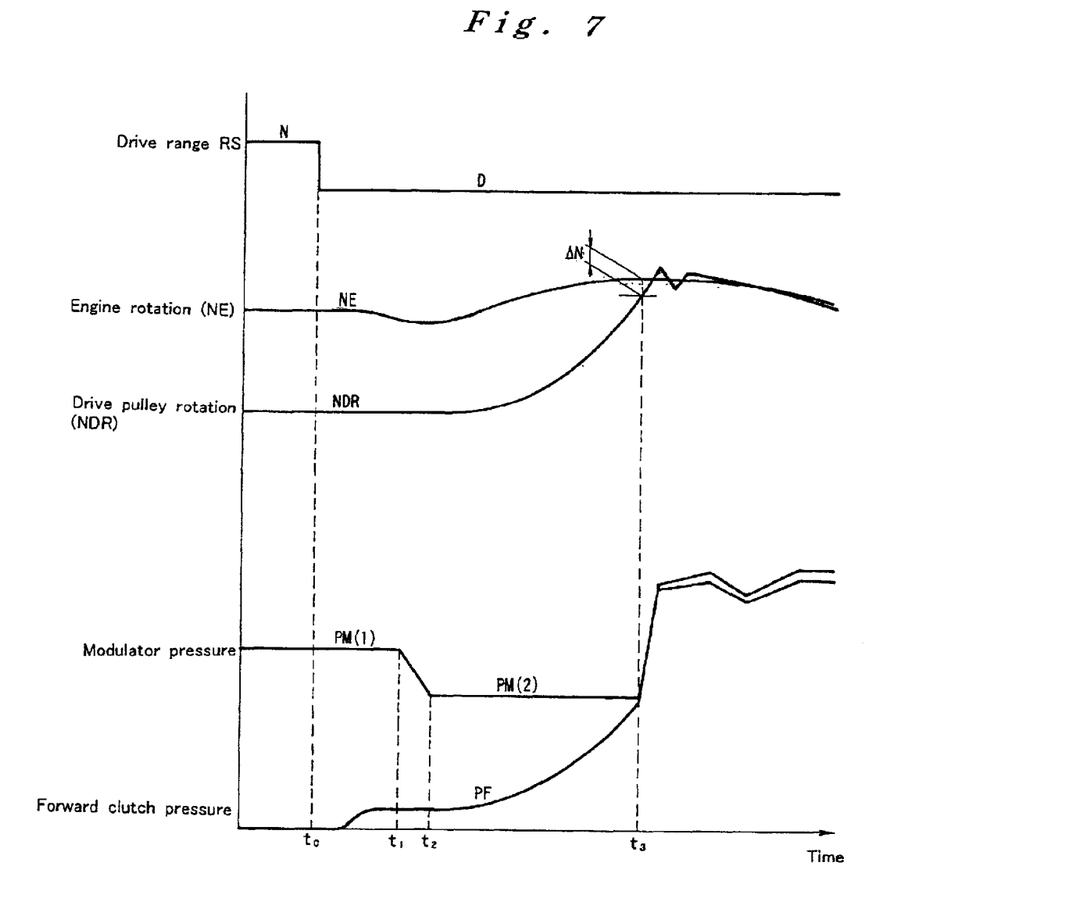
FIG. 7 is a graph showing changes observed in some properties while the control steps of the flowchart are being performed.

Now, in reference to FIGS. 6 and 7, the control steps executed by the control unit 100 are described for a case where the shift lever is shifted from a position for the N range (this position is referred to as "N" position) to a position for the D range (this position is referred to as "D" position). The following description is specifically for a case where the shift lever is shifted from "N" position to "D" position, and the drive-range signal RS changes from "N" to "D" at time t0 as shown in FIG. 7.

When the drive-range signal RS, which is sent from the drive-range sensor 105 to the control unit 100, changes from "N" to "D", the control unit 100 starts in-gear control, which is described in the flowchart shown in FIG. 6. At first, a determination is made at Step S1 whether or not this control flow is the first passage through this routine of the in-gear logic. In other words, whether this turn of control flow passing through Step S1 is the first turn or not is determined at Step S1. The first passage through this routine, as it is the first turn, definitely proceeds to Step S2, where the time for the invalid-stroke clearing is set.

The invalid-stroke clearing is a control that quickly brings the forward clutch 30, which is engaged for the D range, to a position where the actual engagement of the clutch can start immediately. In the invalid-stroke clearing of the forward clutch 30, which comprises a hydraulically actuated wet type multiple disc clutch, the part of the stroke that does not contribute to the actual engagement (this part of the stroke is referred to as "invalid stroke") is eliminated. Thereafter, when the hydraulic pressure is applied onto the piston of the forward clutch 30, the forward clutch 30 is immediately brought into engagement.

The invalid-stroke clearing is executed by supplying oil in an amount necessary to slide the piston of the forward clutch 30 to clear the invalid stroke. The time required for completing the charge of oil to the required amount depends on the supply pressure and the temperature (viscosity) of the oil. As the invalid-stroke clearing must be quickly performed so as not to cause a delay in the engagement actuation of the forward clutch 30, the modulator pressure PM, i.e., the supply pressure, is set to a predetermined high pressure as shown in FIG. 7. When the transmission is switched from the N range to the D range, the accelerator pedal is in released condition. In this condition, the throttle is completely closed, and the engine is rotating idly. The line pressure PL is set at a pressure equal to or lower than the predetermined pressure that is set by the modulator valve 85, so the line pressure PL passes through the modulator valve 85 as is as mentioned above and is supplied as the modulator pressure PM. In other words, PM=PL.

At Step S2, a determination is made for setting the oil supply time (i.e., the invalid-stroke clearing time) necessary for completing the invalid-stroke clearing of the forward clutch 30 with oil at the current CVT oil temperature (TCVT) at the modulator pressure PM (=the line pressure PL). Values for the invalid-stroke clearing time are predetermined against values for the CVT oil temperature (TCVT) by measurement or by calculation and are stored in memory. At Step S2, the invalid-stroke clearing time is set by retrieving such a value that corresponds to the CVT oil temperature (TCVT) being measured currently. At the moment when the D range is selected, the supply of the modulator pressure PM through the manual valve 80 to the forward clutch 30 is initiated to start the invalid-stroke clearing.

Then, the control flow proceeds to Step S3 and Step S4, where the hydraulic pressure necessary for each of the drive pulley 11 and the driven pulley 16, i.e., for the drive cylinder chamber 14 and the driven cylinder chamber 19, during the invalid-stroke clearing is determined, respectively. Then, the drive control valve 70 and the driven control valve 71 are controlled to produce the hydraulic pressure, respectively, at these determined values, from the line pressure PL, and oil is supplied to the drive cylinder chamber 14 and the driven cylinder chamber 19 at these pressure values.

The control flow repeats the routine described in the flowchart of FIG. 6 at a predetermined cycle (for example, every 10 ms). The second turn of the control flow passing through the in-gear logic proceeds from Step S1 to Step S5 because it is the second time. At Step S5, a determination is made whether the invalid-stroke clearing time set as described above has elapsed or not. In this way, the control steps at Step S3 and Step S4 are repeated until the invalid-stroke clearing time is over. While these steps are repeated, because the manual valve 80 is set at the position for the D range, the modulator pressure PM (=PL) is being supplied to the forward clutch 30 for the clearing of the invalid stroke.

When the invalid-stroke clearing time is over, and the invalid-stroke clearing is complete, the forward clutch 30 is ready to start actual engagement. If the result of the determination at Step S5 is that the invalid-stroke clearing time has elapsed, then the control flow proceeds to Step S6, where another determination is made whether it is possible to lower the line pressure PL or not. In this determination, the conditions listed in Table 1 below are judged.

TABLE 1

Is the throttle sensor not broken down?
Is the rotational speed NE of the engine below a predetermined value?
Is the rotational speed or the acceleration of the drive pulley below a predetermined value?
Was the reduction ratio at the time prior to the N range larger than a predetermined value?
Is the CVT oil temperature (TCVT) equal to or higher than a predetermined temperature?
Is the temperature of the engine coolant (TENG) equal to or higher than a predetermined temperature?
Is the throttle closed?
Is the vehicle speed V below a predetermined speed?

Furthermore, while the judgment of these conditions is executed, how the shift lever is manipulated, i.e., whether the movement of the shift lever is in N-D, N-R, R-D or D-R, is determined from the drive-range signal RS and the released condition of the forward clutch and the reverse brake, which are estimated indirectly from the rotational speed of the engine and the rotational speed of the drive pulley. Then, a value for a line-pressure lower limit timer is read in from the predetermined data in memory against the current CVT oil temperature (TCVT).

Then, at Step S7, a determination is made whether the time set for the line-pressure lower limit timer has elapsed or not. Until this time set for the timer is over, the control flow proceeds to Step S8. If the time set for the timer has elapsed, then the control flow proceeds to Step S13, where the pulley control pressure is adjusted for an ordinary drive mode. The control performed at Step S13 is the same as the conventional control practiced for the pulleys in speed ratio control, so no further explanation is provided here. At Step S8, a determination is made whether or not the conditions listed in Table 1 are all satisfied to allow the lowering of the line pressure. If all the conditions in Table 1 are satisfied to lower the line pressure, then the control flow proceeds to Step S9. If any of the conditions is not satisfied, and the lowering of the line pressure is not allowed, then it proceeds to Step S13, where the pulley control pressure is adjusted for an ordinary drive mode.

At Step S9, a limit value is calculated for each pulley pressure in this in-gear transition. Limit values for the drive and driven pulleys are predetermined against values for the CVT oil temperature (TCVT) and values for the rotational speed of the engine NE and are stored in memory. At Step S9, the hydraulic pressure limit values for the pulleys in the in-gear transition are read in from the predetermined and stored data against the current CVT oil temperature (TCVT) and the current engine rotational speed NE. Specifically, in-gear transition pulley pressure limit values for the drive and driven pulleys are predetermined against values for the CVT oil temperature (TCVT) and those for the rotational speed of the engine NE for each of the five shift patterns, i.e., four patterns of N-D, N-R, R-D and D-R and an extra pattern, and these data are stored in memory. Therefore, the in-gear transition pulley pressure limit values are read in from the table of the data against the shift pattern currently detected.

Then, the control flow proceeds to Step S10~Step S12, where lower values for the hydraulic pressure of the drive and driven cylinder chambers 14 and 19 are determined, and the reduction rates for lowering the hydraulic pressure are determined or modified. At these control steps, the operation of the drive and driven control valves 70 and 71 is controlled to lower the hydraulic pressures to the respective lower values at the reduction rates being modified.

For the lowering of the hydraulic pressures of the drive and driven cylinder chambers 14 and 19 to the respective lower values at the respective reduction rates, the drive and driven signal pressures Pdr and Pdn, which are applied from the drive and driven control valves 70 and 71 to the drive and driven shift control valves 60 and 65, are lowered. When the drive and driven signal pressures Pdr and Pdn are lowered, the line pressure PL, which is adjusted by the regulator valve 50, is also lowered. Because this line pressure PL as is is supplied as the modulator pressure PM to the forward clutch 30, the modulator pressure PM applied to the forward clutch 30 is lowered.

FIG. 7 shows changes that are observed in some properties while the above described control steps are being executed. When a shift operation from the N range to the D range is detected at time t0, the modulator pressure PM, which is supplied to the forward clutch 30, is fixed at a predetermined high pressure PM(1). When the invalid-stroke clearing time has elapsed at time t1, the hydraulic pressures of the drive and driven cylinder chambers 14 and 19 are lowered at the respective predetermined reduction rates to the respective lower values, and the modulator pressure PM is lowered from PM(1) to PM(2). This lowered modulator pressure PM(2) is maintained until the time set on the line-pressure lower limit timer elapses, i.e., time t3.

As a result, the forward clutch 30, which has been ready for actual engagement after the completion of the invalid-stroke clearing at time t1, receives the lowered modulator pressure PM(2), and the pressure of the forward clutch increases gradually as shown in FIG. 7. Therefore, the forward clutch 30 engages smoothly to gradually bring the rotational speed of the drive pulley NDR closer to the rotational speed of the engine NE. In this way, any occurrence of shock, vibration or noise is prevented in the engagement. After time t3, i.e., after the time set on the line-pressure lower limit timer has elapsed, the line pressure PL and the modulator pressure PM are increased for ordinary drive mode control.

In the above described control, the time for maintaining the lowered modulator pressure PM(2) is set by the line-pressure lower limit timer. Instead, the timing to proceed to the ordinary drive mode control may be decided by determining whether the difference ΔN between the rotational speed of the engine NE and that of the drive pulley NDR has become equal to or smaller than a predetermined value. The above description is made for a shift from the N range to the D range as an example. However, the present invention is not limited to this. The same control can be applied to a shift from the N range to the R range, from the R range to the D range, or from the D range to the R range to smoothly engage the forward clutch 30 or the reverse brake 25 without any shock, vibration or noise.

In the above embodiment, a belt-type continuously variable transmission is used as an example. However, the application of the present invention is not limited to this type of automatic transmission. It can be applied to other types of automatic transmission including an automatic transmission that comprises a mechanism to change the speed ratio in steps.

As described above, a control system according to a first feature of the present invention operates as follows. For example, when the shift lever is manipulated from "N" position to "D" position to shift a manual switching valve from its N position to its D position, the line pressure adjusted by a regulator valve is supplied to a forward clutch, which constitutes the forward/reverse direction-change mechanism, for the engagement of the forward clutch. Specifically, for a predetermined time period after the manual switching valve is set at the D position, the line pressure, which is adjusted by the regulator valve, is lowered to gradually engage the forward clutch. In this way, the ratio-change mechanism, which has a relatively large rotational inertia, is brought gradually into engagement with the output shaft of the engine. As the rotational inertia of the ratio-change mechanism is gradually received by the output shaft of the engine, the forward clutch is brought into engagement without any shock or noise.

This automatic transmission may comprise a hydraulic actuator for speed ratio control, which receives a line pressure to control the ratio-change mechanism. The hydraulic pressure supplied to this ratio-controlling actuator is to control the torque transmission of the ratio-change mechanism. When the line pressure supplied to the forward clutch is low, the torque transmission through the forward clutch is small. Therefore, there is no problem to supply this low line pressure also to the ratio-controlling actuator. By lowering the line pressure in this way, the power requirement for running the pump to generate the line pressure is reduced to improve fuel efficiency.

According to another feature of the present invention, an automatic transmission comprises a continuously variable speed control mechanism, a forward/reverse direction-change mechanism and a forward/reverse direction-change actuator. In this case, the continuously variable speed control mechanism comprises a variable width drive pulley and a variable width driven pulley and belt means, which is disposed around these pulleys. The forward/reverse direction-change mechanism switches the rotational direction of the rotational driving force transmitted from a drive power source through the speed control mechanism, and the forward/reverse direction-change actuator actuates the operation of the forward/reverse direction-change mechanism by receiving a hydraulic pressure. When the shift of the manual switching valve to a position where the line pressure is to be supplied to the forward/reverse direction-change actuator is detected by a switching operation detector, the line pressure, which is adjusted by the regulator valve, is lowered for a predetermined time period. As a result, the forward clutch is brought gradually into engagement, so that the rotational inertia of the speed control mechanism is gradually received by the output shaft of the engine. In this way, the forward clutch is brought smoothly into engagement without any shock or noise.

Furthermore, the control system may comprise a shift control valve to control the supply of the line pressure to the drive and driven cylinder chambers, which are provided respectively in the drive and driven pulleys. With this arrangement, when the line pressure is lowered for a predetermined time period after the manual switching valve has shifted to the position where the line pressure is to be supplied to the forward/reverse direction-change actuator, the drive and driven cylinder chambers also receive this lowered line pressure. Because of the line pressure being lowered in this way, the power requirement for running the pump to generate the line pressure is reduced to improve fuel efficiency.

The forward/reverse direction-change mechanism may be disposed between the drive power source and the continuously variable speed control mechanism, and clutching means for controlling the transmission of the drive power may be provided on the output side of the continuously variable speed control mechanism. In this case, the above mentioned lowered line pressure is used for engaging the forward/reverse direction-change mechanism smoothly and then for engaging the clutching means smoothly, thus achieving a smooth starting operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2001-176966 filed on Jun. 12, 2001, which is incorporated herein by reference.

What is claimed is:

1. A control system for an automatic transmission comprising a ratio-change mechanism characterized by a continuously variable speed control mechanism, which includes a variable width drive pulley, a variable width driven pulley and belt means disposed around these pulleys, for transmitting a rotational driving force from a drive power source in a continuous ration change, a forward/reverse direction-change mechanism, which switches from said drive power source through said ratio-change mechanism, said forward/reverse direction-change mechanism disposed between said drive power source and said continuously variable speed control mechanism, forward/reverse direction-change actuator, which actuates direction-change operation of the forward/reverse direction-change mechanism by receiving a hydraulic pressure, and a starting clutching means for controlling transmission of drive power provided on an output side of said continuously variable speed control mechanism;

said control system comprising:
a regulator valve, which generates a line pressure by adjusting a hydraulic pressure from a hydraulic pressure source;
a manual switching valve, which is operated by an external factor, to switch a supply of oil at said line pressure to said forward/reverse direction-change actuator; and
a switching operation detector, which detects movement of said manual switching valve;

wherein:
when the movement of said manual switching valve to a position where said line pressure is to be supplied to said forward/reverse direction-change actuator is detected by said switching operation detector, said line pressure, which is adjusted by said regulator valve, is lowered for a predetermined time period immediately after this detection to gradually engage said starting clutching means.

2. The control system as set forth in claim 1, wherein: when the movement of said manual switching valve to a position where said line pressure is to supplied to said forward/reverse direction-change actuator is detected by said switching operation detector, at first, invalid-stroke clearing, which brings said forward/reverse direction-change actuator into a condition ready to start real actuation, is executed, and then, said line pressure, which is adjusted by said regulator valve, is lowered.

3. The control system as set forth in claim 1, wherein: the lowering of said line pressure, which is adjusted by said regulator valve, is executed at first by lowering said line pressure to a predetermined lower value at a predetermined reduction rate and then by maintaining said line pressure at said predetermined lower value for a time period that is set on a line-pressure lower limit timer in correspondence to temperature of oil used in said ratio-change mechanism.

4. The control system as set forth in claim 1, further comprising a ratio-controlling actuator, which receives a hydraulic pressure to actuate speed ratio control of said ratio-change mechanism, wherein:

said ratio-controlling actuator receives said line pressure to actuate the speed ratio control.

5. The control system as set forth in claim 1, further comprising a drive cylinder chamber provided in said drive pulley, a driven cylinder chamber provided in said driven pulley and a shift control valve, which controls a supply of hydraulic pressure to said drive cylinder chamber and said driven cylinder chamber, wherein:

said shift control valve controls a supply of oil at said line pressure to said drive cylinder chamber and said driven cylinder chamber.

6. The control system as set forth in claim 1, wherein the lowered line pressure is lower then the line pressure which is set at a neutral range of said automatic transmission.

* * * * *